United States Patent Office 3,425,202
Patented Feb. 4, 1969

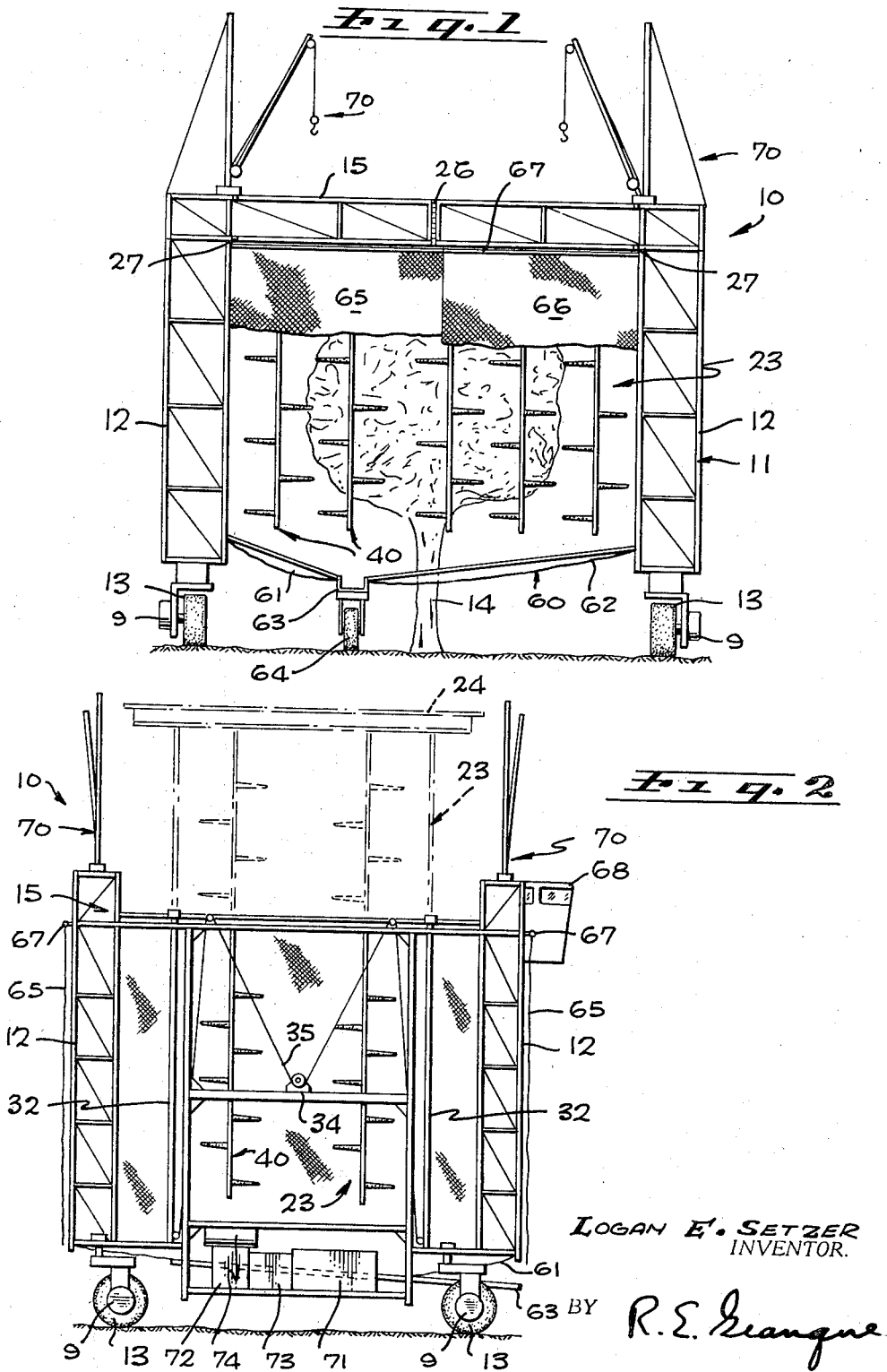

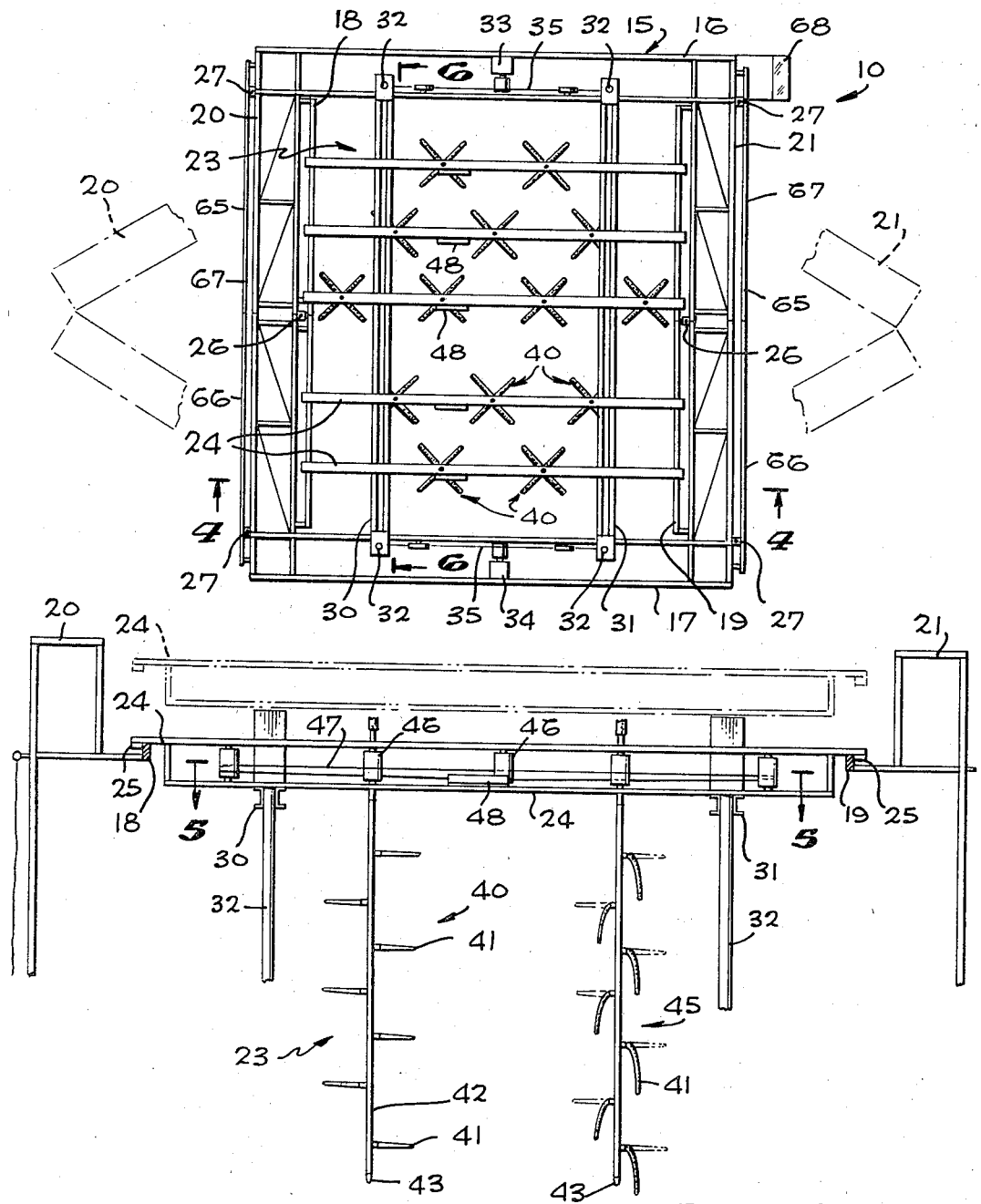

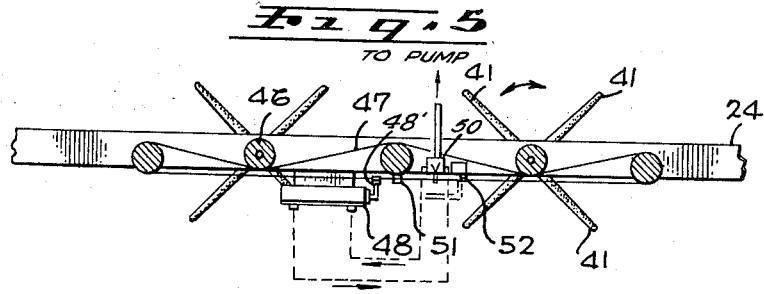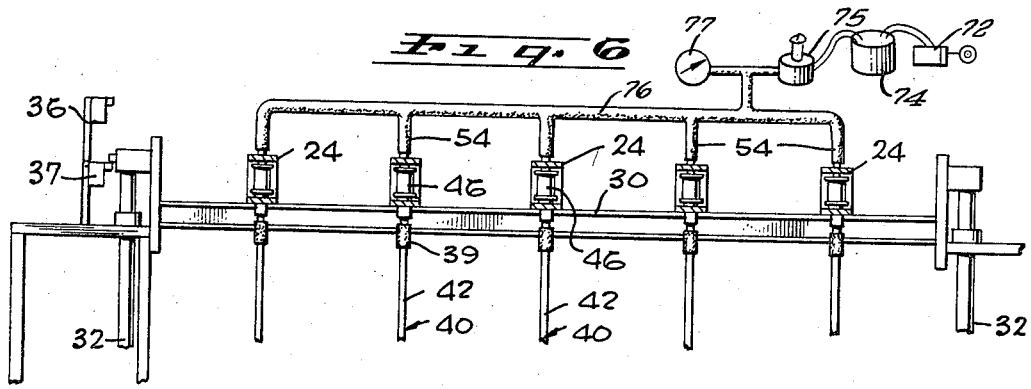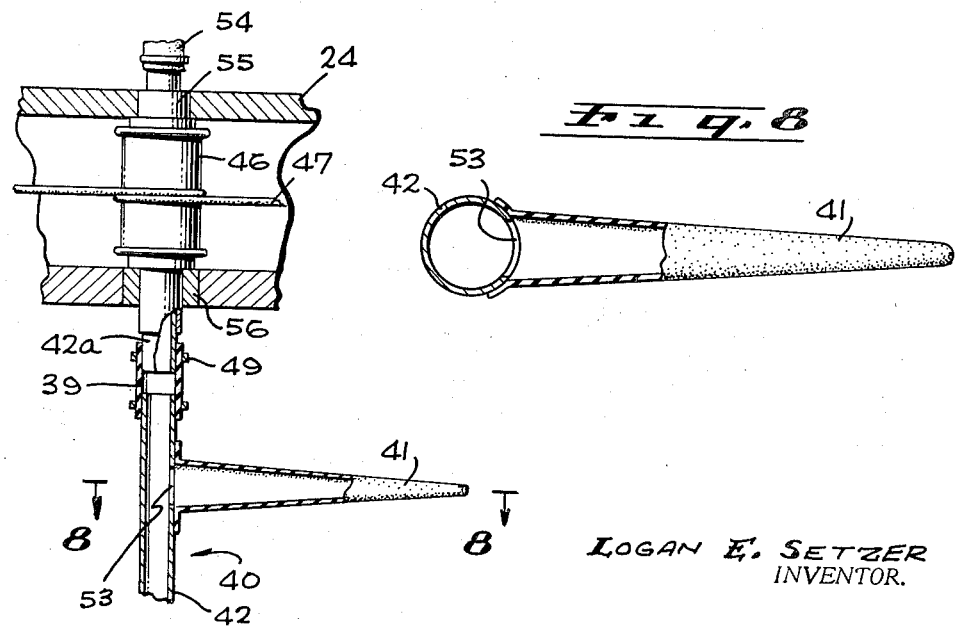

3,425,202
FRUIT HARVESTER
Logan E. Setzer, 9013 Reading Ave.,
Los Angeles, Calif. 90045
Filed Jan. 5, 1966, Ser. No. 518,927
U.S. Cl. 56—328                    10 Claims
Int. Cl. A01g 19/00

ABSTRACT OF THE DISCLOSURE

A fruit harvester is disclosed herein including a wheeled vehicle having upright stanchion frame supported on upper centrally opened framework. A vertically movable fruit flailing apparatus is supported on the upper framework and includes a plurality of downwardly depending rotatable flailing units. Each flailing unit includes a plurality of selectively inflatable swipples radially disposed from a hollow shaft for engaging the fruit of the tree.

---

This invention relates, in general, to fruit harvesters or the like, and more particularly to a novel fruit harvester for gathering a plurality of fruit at one time.

While various aspects of the present invention may be applicable for the harvesting of crops of a wide variety of shapes, sizes, dimensions and growth forms, the present invention is shown by way of example as particularly designed for the picking of tree grown crops such as plums. The invention provides for the picking of fruit such as nuts, plums, peaches, pears, some varieties of apples as well as other kinds of citrus fruit crops or the like without the aid of manual manipulation, without injury to the fruit or the tree and in simultaneous multiple manner.

Numerous harvesting devices and equipment have been provided in the past for separating citrus fruit and various crops or the like from trees, bushes and vines. Some of this conventional equipment includes tree shakers which normally couple the equipment to the trunk or limb of a tree so that a vibratory or shaking motion can be imparted thereto. However, the shaking of the tree often causes damage by breaking the bark and thereby making the tree vulnerable to fungus growth in the cracks. Obviously, this results in the tree being severely damaged or killed. Other conventional apparatus include means for inserting a plurality of spaced apart rotating spindles into the periphery of a bearing fruit tree to permit paddle members or wire cages thereon to forcibly engage the fruit and cause its removal from the tree. Difficulties and problems have been encountered when employing this type of device inasmuch as the wire cages or paddles which are employed to engage the fruit often damage the surface of the fruit which permits fungus and other growths to develop in the damaged areas. Furthermore, the paddles or wire elements, being solid and rigid members, often-times causes considerable damage to the branches to such an extent that future growth of fruit from these areas is retarded.

Therefore, a need has long existed to provide an automatic harvesting apparatus for fruit which provides expeditious and economical removal of the fruit or crop from the tree without damage and undue manual manipulation or selective individual handling. The present invention provides such an apparatus which serves as a simple, efficient and effective instrumentality for the rapid, simultaneous and successive severance and gathering of such fruit, or the equivalent from its normal attachment to a shrub, vine or tree. A feature of the present invention resides in the fact that the apparatus is readily portable and is capable of being moved not only from tree to tree but which may be moved between a plurality of remote locations of operations such as orchards located in widely separated areas. The device can be conveniently folded and rearranged into a roadable condition so that the apparatus may be employed as a self-powered motorized vehicle or one which may be pulled as a trailer, if desired. The apparatus is also susceptible of remote or ground control to selectively direct the locus of activity from point to point with a minimum of physical labor or effort.

Accordingly, the device of the present invention obviates the problems and difficulties encountered with conventional fruit harvesting apparatus and provides a wheeled vehicle including upright framed stanchions defining an open framework which is capable of being rotatably supported so as to be readily moved into and out of position over a tree from which fruit is to be gathered. Vertically movable on the framework, there is provided a flailing apparatus having a plurality of individual rotatable flailing units supported on the apparatus which are rotatably inserted together into the tree so that individual flailing elements or swipples come into contact with the fruit and cause the fruit to be separated from its connection with the tree so that it falls into receiving nets or gathering apparatus below. A feature of the invention resides in the fact that the swipples employed are of resilient composition so that they may be readily inflated to various conditions of hardness so that the skin surface of the fruit will not be damaged by the contact of the swipples therewith during the gathering operation. Preferably, the flailing units are oscillated in a horizontal plane while being moved up and down within specific limits so that full coverage of the tree is assured. Also, the framework is strategically hinged to permit the collapsing or folding thereof into a roadable configuration for transportation purposes.

Therefore, it is a primary object of the present invention to provide a novel fruit harvester having a flailing apparatus incorporating a plurality of fruit engaging oscillating flailing units or swipples which may be inserted through the periphery of a fruit bearing tree so that the particular elements or swipples may more effectively remove the fruit from a tree.

Another object of the present invention is to provide a new and improved fruit harvester which includes a flailing apparatus which may be positioned above the framework therefor to permit a tree to be enclosed by the framework whereby the flailing apparatus can be lowered into the tree so that individual flailing units are permitted easy penetration through the outer area or periphery of the tree for movement into the interior thereof to effect the harvesting of the fruit.

Still another object of the present invention is to provide a novel fruit gathering apparatus which includes a plurality of horizontally and vertically moving flailing units to be positioned within a fruit bearing tree whereby a plurality of inflatable flailing elements or swipples may be strategically located within the tree so as to engage the fruit thereon and to separate the fruit from the tree as the individual units come into contact therewith responsive to simultaneous rotary oscillatory and vertical movement of the flailing units.

Still another object of the present invention is to provide a novel flailing apparatus for use in a fruit harvester which incorporates a plurality of resilient and semi-soft flailing elements carried thereon which are caused to be oscillated in a horizontal plane while being selectively oscillated in a vertical plane simultaneously.

Still a further object of the present invention is to provide a novel array of fruit picking units, so arranged that a tree may be rapidly picked of ripe fruit whereby the tree will not be damaged and that fruit which is not ready for picking will be left in connection with the trees.

A still further important object of the present invention is to provide a fruit harvester including a portable supporting structure, a flailing apparatus disposed on the supporting structure including mechanism associated therewith for moving the flailing apparatus into the picking area of a fruit bearing tree and which includes fruit engaging semi-rigid flailing elements on the flailing apparatus arranged and constructed to engage the fruit causing it to become free of its attachment to the tree branches and further including means for collecting the separated fruit into a receiving container or receptacle.

The feature of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a front elevational view of the novel fruit harvester of the present invention illustrating the flailing apparatus in operable communication with a typical tree for effecting the removal and gathering of fruit therefrom;

FIGURE 2 is a side elevational view of the novel fruit harvester shown in FIGURE 1 and illustrating the flailing apparatus in broken lines in its raised position to permit the harvester to be positioned and maneuvered about a tree;

FIGURE 3 is a top plan view of the fruit harvester shown in FIGURES 1 and 2 and illustrating diagrammatically, in broken lines, the capability of the harvester to be folded for transportation purposes;

FIGURE 4 is a sectional view of the fruit flailing apparatus incorporated into the harvester as taken in the direction of arrows 4—4 of FIGURE 3;

FIGURE 5 is a sectional view of the flailing apparatus taken in the direction of arrows 5—5 of FIGURE 4 illustrating means employed for imparting rotary movement thereto;

FIGURE 6 is a sectional view of a portion of a flailing apparatus taken in the direction of arrows 6—6 of FIGURE 3 illustrating means employed for effecting vertical movement of the individual flailing units;

FIGURE 7 is an enlarged sectional view showing a portion of a typical flailing unit; and FIGURE 8 is a sectional view of a flailer or flailing element incorporated into the unit shown in FIGURE 7 as taken in the direction of arrows 8—8 thereof.

Referring now in particular to FIGURES 1 and 2 of the drawings, a fruit harvester in accordance with the present invention is indicated in the general direction of arrow 10 which embraces the concept of a mobile carriage or framework 11, having four vertical stanchion frames 12, mounted on wheels 13, which may be driven by individual motors (not shown) for independent drive in any selected direction for easy manipulation through a grove or orchard. As indicated by a tree 14 of FIGURE 1, that portion of the apparatus shown in broken lines in FIGURE 2, it will be seen that the frame 12 are designed to be of such a height as to place a picking mechanism or flailing apparatus 23 above the top of the tree, and the rectangular arrangement of the frames 12 are such as to surround the tree 14. Above the tree 14, the frames 12 support a centrally open upper framework 15, as seen more clearly in FIGURE 3. The upper framework includes lateral extensions 16 and 17 which are employed to support a pair of beams 18 and 19 in fixed parallel spaced relationship located on opposite sides of the central opening for the framework 15. The framework 15 also includes a pair of extensions 20 and 21 which are arranged transverse to the extensions 16 and 17 to complete the definition of the central opening for the framework 15.

Situated within the central opening of the framework 15, there is provided the flailing apparatus 23 which includes a plurality of supporting beam members such as represented by beam member 24 which are extended between the beams 18 and 19 across the central opening defined by the framework's extensions. The opposite ends of each beam member 24 includes a guide 25 that extends along the support beams 18 and 19 so that these beams serve as a track over which the plurality beam members are slidably disposed. Such an arrangement permits the beam members to be slid on the supporting beams 18 and 19 to desired locations and also permits the beam members to be slid substantially adjacent to one another at one end of the framework's extension so that the framework can be changed to a roadable configuration for transportation purposes.

In connection with the transportability of the present invention, it is to be particularly noted that the framework extensions 20 and 21 are preferably provided with hinges 26 and 27 respectively, so that the framework 15 may be substantially reduced in width by folding the extensions 20 and 21 as illustrated diagrammatically in broken lines forming a part of FIGURE 3.

A feature of the invention resides in the fact that the flailing apparatus 23 can be elevated into the position shown in broken lines in FIGURE 2 so as to permit the harvester to be moved over a tree and then, lowered into the tree to effect the removal of fruit therefrom. The means for raising and lowering the flailing apparatus include a pair of spaced apart lift members 30 and 31 which extend between the framework extensions 16 and 17 across the central opening thereof in fixed parallel relationship to the beams 18 and 19. The plurality of beam members 24 may rest on top of the lift members 30 and 31 so that by raising the lift members, the flailing apparatus is carried thereon to the elevated position. Conversely, when the lift beams are lowered, the flailing apparatus will be lowered also. The opposite ends of each lift member are secured to an end of a guide rod 32 which stabilizes the flailing apparatus as it is raised and lowered. Power means are employed for effecting the lifting of the lift members 30 and 31 which include a pair of hydraulic motors 33 and 34 which may be suitably mounted on the framing structure and which are operably connected together in a series arrangement so that the ends of the flail lift means will be lifted together when the motors are activated. Through a suitable cable and pulley arrangement indicated by the numeral 35, a lifting force is transmitted to the lifting beams.

The lift power means is also employed for imparting a limited reciprocal vertical movement to flailing apparatus 23 during the operation of fruit picking by providing suitable limit switches 36 and 37, as shown in FIGURE 6, for effecting a reverse movement of the apparatus when the switches are activated. Switch 36 may be pivoted out of the path of travel for the rod 32 when it is desired to raise the flailing apparatus to its maximum height. Therefore, the flailing apparatus can be raised or lowered to accommodate positioning or maneuvering of the harvester about a tree as well as during the operation of the harvester for effecting removal of fruit from the tree.

Through the cable and pulley arrangement, a lifting force is transmitted to the flail lift rods 32 and then to the flail lift beams. The beams will raise the flailing apparatus out of the tree sufficiently high to permit passage of the framework 15 over the trees.

Referring now to FIGURE 4, a flailing unit indicated in the general direction of arrow 40 is shown which is downwardly depending from the beam 24 in parallel with respect to other units. Each flail unit includes a plurality of swipples or flailing elements 41 which are arranged in longitudinally spaced relationship along the length of a hollow rotatable shaft 42. The extreme end of shaft 42 includes an angular member 43 which serves as a means to prevent the unit from becoming caught or trapped in portions of the tree branches or the trunk itself. Member 43 is intentionally offset from the central longitudinal axis of the shaft 42 so that as the shaft rotates, the tip member 43 will work itself out of any branches of the tree which otherwise would cause the unit to become caught. A feature of the present invention resides in the fact that the individual flailing elements 41 are inflatable to a desired half-hard or semi-rigid condition so that these elements will radially project outwardly from the supporting shaft 42. However, when the elements are in their deflated condition, the elements are extremely flexible and hang loosely about the shaft 42 as indicated in solid lines in connection with the unit indicated in the direction of arrow 45. The end of shaft 42 opposite to its end carrying tip member 43 serves as an axle for a flail drive cable drum 46 and as seen more clearly in FIGURE 5, a cable 47 is connected in a closed loop around all of the drums carried on a single beam 24. A hydraulic cable drive arrangement is employed to achieve rotation of the flailing units and a hydraulic cylinder 48 having a piston arm 48' attached to the cable, and a quick acting valve 50 mounted on means 24 between stops 51 and 52 is employed to drive the cable. Adjustable stops 51 and 52 are fixed on the cable 47 which actuate the valve causing the cylinder rod to operate with a reciprocating motion. This reciprocating motion of the cylinder rod is transmitted through the cable to the cable drum and causes the flailing unit to rotate first in one direction and then in a reverse or opposite direction. Preferably, the dimensions of the cable length and cable drum diameter, the cylinder rod length and spacing between the stops are selected to provide a maximum of at least one and one-half revolutions for the flailing units.

A suitable air supply is coupled to the uppermost end of the tubes 42 via hoses 54 which supply sufficient air under pressure from a compressor 72 and a tank 74 to inflate the flail elements 41 to any desired degree of hardness as controlled by suitable means as a hand valve 75 and manifold 76. The degree of hardness may be indicated by a meter 77 as shown in FIGURE 6.

With respect to FIGURE 7, it can be seen that the shaft 42 is a hollow member which includes a plurality of passages, such as passage 53 which communicates the interior of the flail elements 41 with the inner bore of the shaft tube 42. A suitable air supply is coupled to the uppermost end of tube 42 via a hose 54 which supplies sufficient air under pressure to inflate the flail element 41 to any desired degree of hardness. As indicated in FIGURE 7, the shaft 42 is set in bearings 55 and 56 which are journaled in the structure of beam 24. The shaft 42 includes an upper portion 42a from which the main shaft 42 downwardly depends. The shaft 42 is coupled to the upper portion by means of a flexible connection taking the form of a hose 39 having its opposite ends secured to the opposing ends of the shaft and its upper portion by such means as clamps 49.

With reference to FIGURE 8, a typical configuration of the inflatable flail 41 is shown wherein the element may be made of any flexible material such as plastic, synthetic, rubber or the like. Swipple 41 may be suitably mounted on shaft tube 42 by any means such as fasteners, adhesives, rivets, etc., so long as care is exercised to avoid metal parts extending beyond the flail which may become entangled in the limbs of the tree.

The harvester of the present invention also includes gathering apparatus for collecting the fruit or crops which have been separated from the tree. Such apparatus includes, as shown in FIGURES 1 and 2, a canvas means 60 comprising sections 61 and 62 which are joined at their adjacent ends by a funnel type conveyor 63 which is supported by means of a wheel 64. The outboard ends of the canvas sections are detachably connected to the upright stanchion frames 12 so that the canvasses can be readily removed after the picking operation to enable the harvester to be moved to another tree. The canvas means completely covers the area beneath the tree and particularly around the trunk of the tree 14 so as to be in position to catch the fruit as it is removed therefrom. A feature of the canvas means resides in the fact that the means is lower in the center so that the canvas sections 61 and 62 converge towards and terminate at the funnel trough 63 so that the gathered fruit collects in the trough 63 where such means as a conveyor belt or the like (not shown) may transport the collected fruit to bins or containers disposed at the end of the trough 63. The trough 63 is intentionally canted in a fore and aft direction so that the fruit will travel to the lower end of the trough where containers may be located. The canvasses are detachably connected to the harvester by any suitable means.

Also included in the harvester shown in FIGURES 1 and 2, there is provided side and end curtains, such as end curtains 65 and 66 which are slidably arranged on rods 67 so that the tree 14 may be completely enclosed during the picking operation. The curtains may be so arranged as to be actuated by automatic equipment or by manual means as desired.

An operator's cab 68 is provided on the upper frame 15 which may be employed to house the controls instrumentalities for operating all of the systems incorporated into the harvester.

Supportably mounted on the framework 15 adjacent each upright stanchion 12, there is provided a boom apparatus, as indicated in the general direction of arrow 70 which may be employed for a variety of usages. For example, after an orchard has been picked, and it is desirable to change the harvester to its roadable configuration for transportation to another orchard, the boom apparatus 70 may be used to remove the flailing lift beams 30 and 31 from their upwardly slidable mounting on the extensions 16 and 17 so that the beams 24 may be slid on tracks 18 and 19 against extension 16. Thereupon, extensions 20 and 21 may be pivoted to the position as shown in broken lines in FIGURE 3 to reduce the width of the harvester. The removed beams 30 and 31 may then be placed in any convenient location on the folded harvester so that the harvester may be moved to another location as a unit.

Actual operation will be described in connection with FIGURES 1 and 2 wherein the flailing apparatus 23 is in the raised position, and the funnel canvasses are in their retracted position against the sides of the harvester. The harvester may be moved in place over the tree 14 from which the fruit is about to be removed. Preferably, the harvester should be positioned symmetrically over the trunk of the tree and when in this position, the curtains, such as curtain sections 65 and 66 are closed and the funnel canvas sections 61 and 62 are closed beneath the tree so that they are in position to receive the severed fruit and process the fruit to the trough 63. The flailing apparatus 23 is then lowered into the flailing position as shown in solid lines in FIGURE 2. As the flailing apparatus is lowered, the drive mechanism for the rotary movement of the individual flailing units 40 is actuated. As the rotary motion continues in the individual flailing units, tip member 43 assists the entrance of each flailing unit into the interior of the tree so as to prevent hang-up or entrapment of the units in the branches or trunk of the tree. The swipples 41 which are made of a soft resilient rubber or plastic covered fibrous material may be inflated by pneumatic pressure to the desired hardness. As the flailing apparatus is agitated, the swipples come in contact with the fruit and knock the fruit from the branches of the tree. The reciprocating up and down movement of the flailing apparatus is also put into effect so that both rectilinear vertical motion as well as rotary movement of the swipples is effected. Each swipple is inflated to a pneumatic pressure sufficient so that it will be radially extended and will strike all of the fruit within its reach but yet be soft enough to knock the fruit off the branch without damage to either the tree or the fruit.

The funnel canvasses provide a means of conducting the fallen fruit so that the fruit may be collected into containers or bins without damage. The side curtains also protect the fruit from damage and assist in directing fallen fruit into the collecting canvasses once severed. When fruit is knocked from the tree it may strike the side curtains of the harvester and then fall to the bottom of the collecting canvas where it will join other fallen fruit and roll down the inclined sides of the canvas to the conveyor trough 63.

For propulsion purposes since the soil conditions in an orchard may vary over a wide range, it is preferable that the propulsion wheels be very large, wide, low pressure tires and that the wheels be geared to turn at a fairly low speed. Low speed may be achieved by means of sprockets and chains between individual motors, such as represented by numeral 9, and the propulsion wheels. The propulsion system may be employed for road speed at about thirty miles per hour. For normal steering purposes, the two rear wheels are preferably connected together and locked pointing in the forward position. The two front wheels will be connected together and will be controlled by means of a conventional steering wheel in the operator's station 68. Individual brakes and individual throttles for the drive motors are preferably to be provided for each of the four wheels.

To complete the hydraulic and pneumatic systems, a suitable compressor 72 is mounted on the harvester as shown in FIGURE 2 which may be employed supplying air to hose connections 54 via an air receiver tank 74 to inflate the swipples. A hydraulic pumping apparatus 73 and a hydraulic tank 71 are employed for supplying hydraulic pressure to operate the flailing units via cylinder 48. The pump may be connected to the valve 50 by any convenient means to effect rotation of the flailing units and the air compressor may be suitably coupled to the flailing unit hoses 54 for supplying air, under pressure, thereto.

While particular embodiments of the present invention have been shown and described, it will be obvious to those skilled in the art that changes and modifications may be made without departing from this invention in its broader aspects.

What is claimed is:

1. In a fruit harvester, the combination which comprises:
   a wheeled vehicle including upright stanchion frames;
   an upper centrally open framework supported by said frames;
   vertically movable fruit flailing apparatus supported from said upper framework;
   said flailing apparatus including a plurality of downwardly depending rotatable flailing units;
   each flailing unit including a plurality of selectively extendable and inflatable swipples radially disposed from a hollow shaft for engaging the fruit of a tree; and
   means carried on said framework for inflating said swipples via said hollow shaft of each of said units.

2. The invention as defined in claim 1 wherein said swipples are arranged in fixed spaced relationship along the length of said flailing units; and wherein said inflatable means includes means for selectively inflating said swipples to a desired hardness.

3. In a fruit harvester, the combination which comprises:
   a wheeled vehicle including upright stanchion frames;
   an upper centrally open framework supported by said frames;
   vertically movable fruit flailing apparatus supported from said upper framework;
   said flailing apparatus including a plurality of downwardly depending rotatable flailing units;
   each flailing unit including a plurality of selectively extendable swipples radially disposed from a hollow shaft for engaging the fruit of a tree; and
   wherein said swipples are arranged in fixed spaced relationship along the length of said flailing units and wherein each swipple represents an inflatable element adapted to radially extend from said unit when inflated and adapted to hang adjacent said unit when deflated.

4. The invention as defined in claim 3 including hydraulic means carried by the harvester for providing a vertical reciprocating movement to said flailing apparatus whereby said swipples move upward and downward responsive thereto.

5. The invention as defined in claim 4 including hydraulic means carried by said flailing apparatus for rotating said flailing units while said units are moving vertically.

6. The invention as defined in claim 5 including means operable in connection with said vertical hydraulic means and said rotary hydraulic means for limiting the extent of vertical and rotary movement of said swipples.

7. The invention as defined in claim 6 wherein said vertical and said rotary hydraulic means include cable and pulley systems operably connected between said flailing apparatus and said upper framework and between said plurality of flailing units for effecting the respective vertical and rotary movement thereof.

8. The invention as defined in claim 7 wherein the free end of each of said downwardly depending flailing units includes a tip member offset from the central longitudinal axis of said shaft tube for effectively permitting each of said flailing units to auger through the tree.

9. The invention as defined in claim 8 including means removably disposed between said upright stanchion frames beneath the tree to receive and collect that fruit removed from the tree by said swipples.

10. The invention as defined in claim 8 wherein said upper framework includes hinge means for accommodating the folding of harvester so as to decrease the width thereof to effectively make the harvester roadable for transportation.

References Cited

UNITED STATES PATENTS

| | | | |
|---|---|---|---|
| 2,816,411 | 12/1957 | Wilson | 56—27.5 |
| 3,040,507 | 6/1962 | Lasswell | 56—328 |
| 3,205,644 | 9/1965 | Gordinier | 56—328 |

HUGH R. CHAMBLEE, *Primary Examiner.*